United States Patent [19]
Sterner

[11] Patent Number: 5,983,663
[45] Date of Patent: Nov. 16, 1999

[54] ACID GAS FRACTIONATION

[75] Inventor: Anthony J Sterner, Calgary, Canada

[73] Assignee: Kvaerner Process Systems, Inc., Alberta, Canada

[21] Appl. No.: 09/075,488

[22] Filed: May 8, 1998

[51] Int. Cl.[6] .................................................. F25J 3/00
[52] U.S. Cl. ................................. 62/620; 62/922; 62/928
[58] Field of Search ............................... 62/922, 928, 620

[56] References Cited

U.S. PATENT DOCUMENTS

| | | |
|---|---|---|
| 3,417,572 | 12/1968 | Pryor . |
| 4,097,250 | 6/1978 | Pagani et al. . |
| 4,152,129 | 5/1979 | Trentham et al. . |
| 4,169,133 | 9/1979 | Staege ........................................ 62/922 |
| 4,293,322 | 10/1981 | Ryan et al. . |
| 4,318,723 | 3/1982 | Holmes et al. . |
| 4,350,511 | 9/1982 | Holmes et al. . |
| 4,533,373 | 8/1985 | Butz et al. ................................. 62/922 |
| 4,589,896 | 5/1986 | Chen et al. ................................ 62/922 |

*Primary Examiner*—Ronald Capossela
*Attorney, Agent, or Firm*—James G. O'Neill.

[57] ABSTRACT

A process to bulk separate $H_2S$ and $CO_2$ from a sour gas by first cooling the inlet sour gas, passing the cooled sour gas through a separator and removing a liquid acid gas as a bottoms product in a fractionation tower, and then either pumping or free flowing the liquid acid gas into a disposal well. Potential sulphur deposition problems are controlled by recycling liquid acid gas to the plant inlet.

20 Claims, 3 Drawing Sheets

ACID GAS FRACTIONATION

BACKGROUND OF THE INVENTION

1. Field of the Invention

This invention relates generally to the separation of gases, and more particularly, to an improved method and system for the purification of a sour gas stream by the bulk removal of $CO_2$ and $H_2S$ in a manner which substantially lowers costs. The invention also provides a method for prevention of sulphur deposition in piping and equipment commonly found in lean gas streams with high $H_2S$ and $CO_2$ concentrations.

2. Description of Related Art

Methods for bulk removal of $H_2S$ and $CO_2$ (acid gas) from a sour gas stream are well known, and include solvent-based Sour Gas Treating Units (SGTU), Ryan-Holmes, Rectisol, and other processes. The SGTU uses either an amine or physical solvent for removing the acid gas from the gas stream. The Ryan-Holmes process recirculates a lean oil additive to alter the solubility of the components in the system to prevent $CO_2$ freezing problems in the fractionation column while removing $H_2S$ and $CO_2$. The Rectisol process uses a refrigerated methanol system for removal of acid gas by physical absorption. See, for example, Holmes, A. S.; et al., "Process Improves Acid Gas Separation"; Hydrocarbon Processing, p. 131, May 1982; and "Advantages of Rectisol-Wash Process in Selective $H_2S$ Removal from Gas Mixtures", Line-Reports in Science and Technology, 18, 1973.

In 1962, Shell started up the Waterton Gas Plant near Pincher Creek, which had a "Low Temperature Flash" system. It liquified $H_2S$ at low temperatures, then flashed the $H_2S$ off at a lower pressure. This was effective while the $H_2S$ concentration was high in the inlet gas stream.

Examples of such known methods and systems for the bulk removal of $H_2S$ and $CO_2$ from a sour gas are disclosed in U.S. Pat. Nos., such as 3,417,572 to Pryor, which discloses the separation of $H_2S$ from $CO_2$ by distillation; 4,097,250 to Pagani et al., which discloses initial desulfurization in a column by employing a solvent and then the removal of $CO_2$ by a low temperature distillation; 4,152,129 to Trentham et al., which discloses the separation of $CO_2$ and methane in a gaseous mixture, with low energy consumption, if large amounts of $CO_2$ are present; 4,293,322 to Ryan et al., which discloses the distillative separation of $CO_2$ and $H_2S$ by adding a $C_3$–$C_6$ akane to increase the relative volatility facilities of the process; and 4,318,723 and 4,350,511 to Holmes et al., which disclose methods of distillative separation of $CO_2$ and light hydrocarbons by adding a solids preventing agent and lowering the temperature of the $CO_2$.

Most of the known methods recover acid gas containing $H_2S$ and $CO_2$ at low pressures. This recovered acid gas then needs to be processed further in a Sulphur Recovery Unit (SRU), or compressed for injection into a disposal well. Since bulk acid gas removal is primarily a pre-treatment process before a main processing facility, acid gas compression and injection into a disposal well is preferred for handling the waste acid gas stream. However, the high capital and operating cost of removing and disposing of the acid gas using existing processes has been a deterrent to the installation of bulk acid gas removal facilities. Also, sulphur deposition is often a problem with lean sour gas compositions (mainly methane, $H_2S$ and $CO_2$, less than 1 mol. % and ethane+), which can plug off piping equipment. When this occurs, the process must be shut down and cleaned either mechanically or by melting the sulphur deposits out.

Therefore, there exists a need in the art for an improved process for separating $H_2S$ and $CO_2$ from a sour gas stream in a low cost manner, for use in the field, or before a main processing facility, and for removing and preventing sulphur deposition without shutting down the process.

SUMMARY OF THE INVENTION

Accordingly, it is a general object of the present invention to provide an improved method for separating gases and handling sulphur deposition problems. It is a particular object of the present invention to provide an improved process for separating $CO_2$ and $H_2S$ from a sour gas stream. It is a further particular object of the present invention to provide an improved process wherein an inlet sour gas stream is cooled prior to entering a stripping column. It is a more particular object of the present invention to provide an improved process wherein an inlet sour gas stream is cooled prior to entering a stripping column where the bulk of hydrocarbons are stripped off and a liquid $H_2S$ and $CO_2$ stream is recovered as a bottoms product. And, it is yet a still further particular object of the present invention to provide an improved process wherein an inlet sour gas is cooled, a liquid acid gas is stripped off from the sour gas in a column, and the liquid acid gas is then either pumped or free-flowed down a disposal well.

In accordance with one aspect of the present invention, there is provided an acid gas removal process for bulk removal of $H_2S$ and $CO_2$ from a sour gas stream, which is simpler and greatly reduces the amount of acid gas compression required. An added benefit of the process is the removal of trace sulphur compounds from the inlet sour gas stream because this is a cold process. Trace sulphur compounds are removed with the liquid $H_2S$/$CO_2$/$CH_1$ mixture in each separator and end up in the liquid acid gas stream. The process of the present invention works by cooling the inlet sour gas steam prior to entering a stripping column where the bulk of the hydrocarbons are stripped off and a liquid $H_2S$ and $CO_2$ stream is recovered as a bottoms product. The liquid acid gas can then be pumped or free-flowed down a disposal well. Part of the liquid acid gas steam is recycled to the inlet of the first gas/gas exchange for control or removal of sulphur deposits from equipment.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DETAILED DESCRIPTION OF THE PREFERRED EMBODIMENT

The following description is provided to enable any person skilled in the art to make and use the invention and sets forth the best modes contemplated by the inventor of carrying out his invention. Various modification, however, will remain readily apparent to those skilled in the art, since the generic principles of the present invention have been defined herein specifically to provide for an improved gas separation method.

Figure 1:
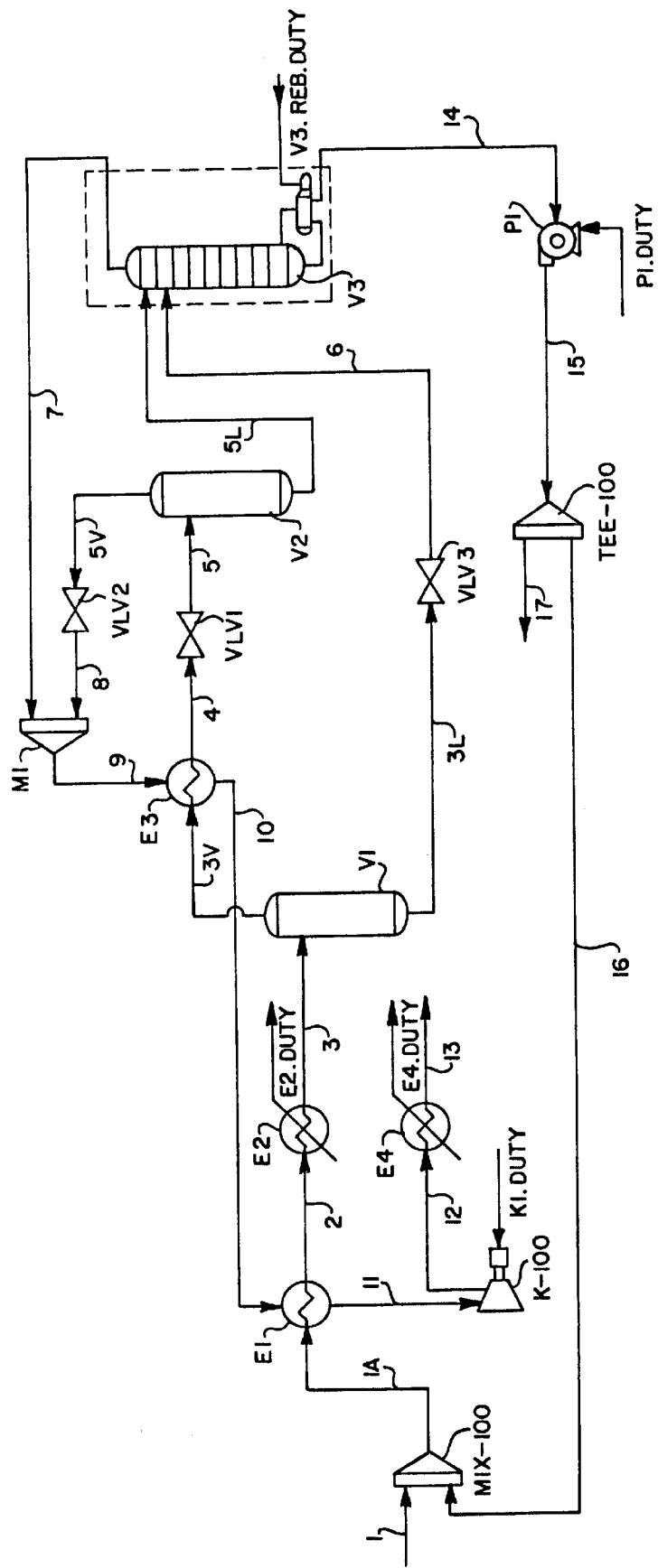
FIG. 1 is a schematic representation of a preferred embodiment of the process of the present invention.

Turning now to FIG. 1 of the drawings, there shown is a schematic representation of a first embodiment of the process of the present invention. To prevent hydrate formation, water is first removed from an inlet sour gas stream 1 by molecular sieve dryers, or by injecting an inhibitor such as methanol therein. Dry, sour gas 1A is cooled by a Gas/Gas Exchanger El and Chiller E2. This cooled sour gas 3 is fed into a separator V1 and condensed liquid 3L composed mainly of methane, $H_2S$ and $CO_2$ is separated therefrom and level controlled to a Fractionation Tower V3. Gas 3V from the top of V1 is further cooled in a Cold Gas Exchanger E3 before the pressure thereof is dropped across a Joule-Thompson valve VLV1 (a turbo-expander could also be used for power recovery). The pressure drop across the valve VLV1 reduces the temperature to cryogenic levels. Downstream of the valve VLV1, a liquid acid gas 5L is separated from a cold gas stream 5 in Separator V2. The liquid acid gas 5L, containing condensed methane and acid gases, is then fed to the Fractionation Tower V3.

The Fractionation Tower is preferably a reboiled distillation column wherein most of the methane and lighter hydrocarbons are distilled from the liquid feeds into the Fractionation Tower by hot stripping vapors generated in the reboiler in a known manner. Enough heat is added to the reboiler to minimize the hydrocarbon content in the residual liquid acid gas bottoms product. The liquid acid gas bottoms product 14 recovered from the distillation column V3 is at a high pressure and, therefore, can be pumped by P1, or free-flowed to a disposal well.

The overhead vapors 7 from the Fractionation Tower V3 are mixed with the main gas stream 8 from Separator V2 in a mixer M1. The mixed cold stream 9 is warmed by passing through the shell side of exchangers E3 and E1. The warmed gas stream 11 is compressed to a required pressure by compressor K-100. The compresser discharge gas stream 12 is cooled by cooler E4 before further processing.

If free sulphur is present in the sour gas stream 1 with a high $H_2S$ concentration, to prevent potential sulphur plugging problems of tubes, the liquid $H_2S$ /$CO_2$ 16 is recycled to the front end of the plant at Mix-100. Sulphur is known to have a high solubility in liquid $H_2S$ (Smith J. J., Jensen, Dan and Meyer, Beat, "Liquid Hydrogen Sulfide in contact with Sulfur", Journal of Chemical and Engineering Data, Vol. 15, No. 1, 1970.), even at cold temperatures. By injecting liquid $H_2S$ into the inlet gas stream at Mix-100, the equilibrium can be shifted to ensure liquid $H_2S$ is formed in the first gas/gas exchanger El, as the gas stream 1A is cooled.

Sulphur deposition can also be controlled by allowing for solvent injection upstream of each exchanger. Some solvents which are effective for sulphur deposition problems include carbon disulfide ($CS_2$), dimethyl disulfide (DMDS), dialkyldisulfide mixtures (MEROX), and diaryldisulfides (DADS).

The amount of recycled liquid will depend on the inlet sour gas composition and the amount of sulphur (lbs. of sulphur/mmscf) present or expected to form from pressure and/or temperature changes. Deposition of sulphur can occur from a drop in temperature or pressure. Deposits can be cleaned by either continuous recycling of liquid acid gas or batch recycling of liquid acid gas.

Figure 2:
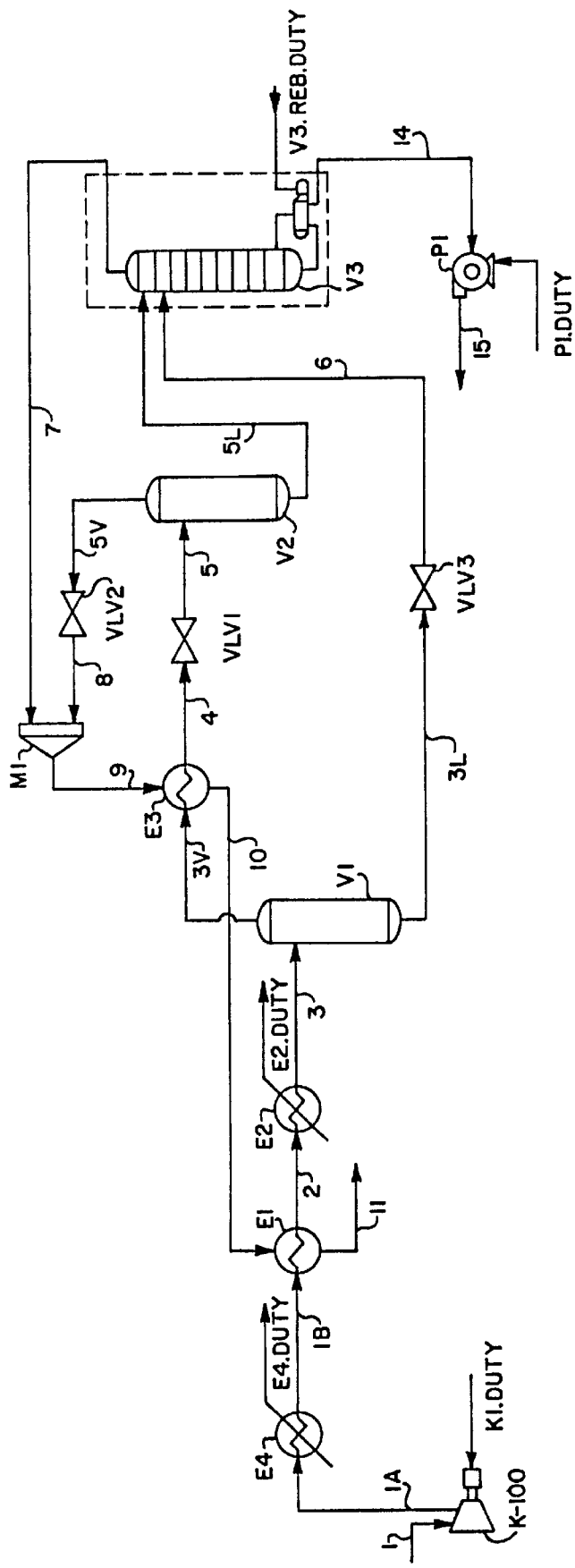
FIG. 2 is a schematic representation of a second embodiment of the invention.

The process can have other configurations than shown in FIG. 1. For example, as shown in FIG. 2, the acid gas fractionation system may have inlet gas compression. This is necessary if the inlet gas pressure is less than about 800 psig. The inlet sour gas stream 1 is compressed in a compressor K-100, and the compressed gas 1A cooled by cooler E4 before passing through the first gas/gas exchanger E1 and chiller E2. Condensed liquids are then separated and fed to the Fractionation Tower V3, as described above. That is, the gas stream is further cooled by a second gas/gas exchanger E3 and by dropping the pressure across a Joule-Thompson valve VLV1. Condensed liquid is again separated from the cold stream and fed to the Fractionation Tower V3. Liquid acid gas is again produced as a bottoms product from the Fractionation Tower V3. The overhead vapor stream 7 from V3 is combined with the main gas stream 8 from separator V2 before being warmed in exchangers E3 and E1.

Figure 3:
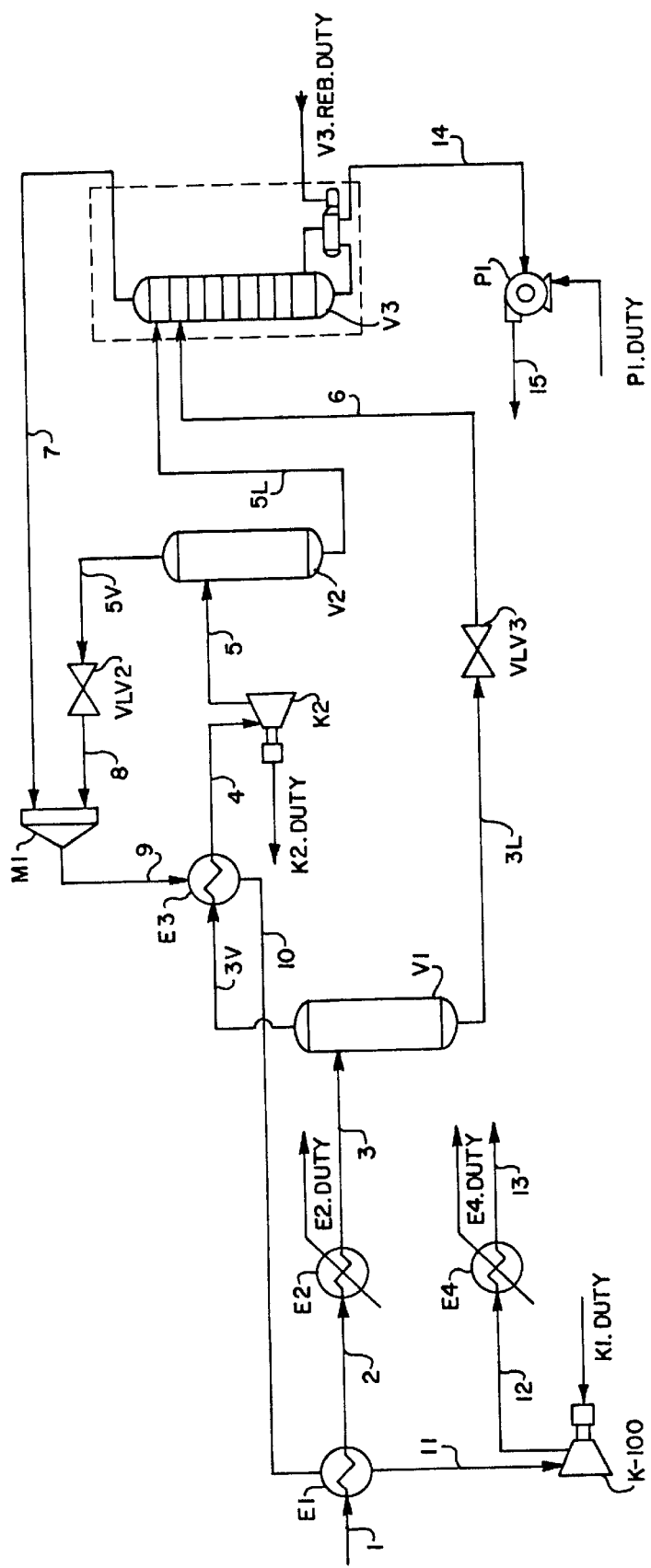
FIG. 3 is a schematic representation of a third embodiment of the present invention.

FIG. 3 shows a further embodiment, similar to FIG. 1, but a turbo-expander or similar power recovery device K2 is used in place of the Joule-Thompson valve VLV1 in the main process plant. This type of a set-up can reduce the horsepower required for sour gas compression by 20 to 30%.

The amount of $H_2S$ and $CO_2$ recovered by the process of the present invention, can be varied by adjusting the pressure downstream of the JT valve VLV1 or turbo expander K2, and by changing the Fractionation Tower bottoms temperature.

A lower pressure results in colder gas and more condensed liquid before separator V2. Each of the above-mentioned processes needs to be evaluated for the practical lower limit on operating pressure and temperature in a given installation. At some point, the amount of methane gas condensed from the gas stream will make further cooling impractical.

Colder temperatures in the processes of the present invention can also be obtained by using other refrigerants (such as ethane or ethylene) instead of propane. However, caution must be exercised to ensure that $CO_2$ freezing does not become a problem in the cold areas of the process.

It should be pointed out that the process design shown in FIG. 1 assumes shell and tube exchangers are used for the two gas/gas exchangers and the chiller with temperature approaches of 10° F. Closer temperature approaches on exchangers can be obtained by using brazed aluminium heat exchangers. This can reduce chiller duty requirements resulting in a smaller refrigeration system.

The processes of the present invention are especially effective and economical if the sour gas stream to be treated contains high concentrations of $H_2S$ and $CO_2$ and small quantities of ethane and higher hydrocarbons. The amount of $H_2S$ and $CO_2$ which can be removed depends on the concentration of $H_2S$ and $CO_2$ in the sour gas stream. The process is most economical for $H_2S$ and $CO_2$ concentrations of 10 mol % or greater.

This process on its own is economical for bulk removal of $H_2S$ and $CO_2$ only. If sales gas and specifications for $H_2S$ and $CO_2$ have to be met, the processes of the present invention has to be augmented with a downstream SGTU.

The processes of the present invention save capital and operating costs by providing an efficient and simple system for bulk acid gas removal. The Acid Gas Fractionation Unit replaces the SGTU and acid gas compressors for bulk acid gas removal and can recover large quantities of liquid acid gas at high pressure. Liquid acid gas can now be pumped down a disposal well using a fraction of the horsepower required to compress the same amount of acid gas from low pressures (which is required with other known systems for bulk acid gas removal).

Not only is the amount of acid gas compression reduced, but the total installed horsepower for the acid gas fractionation facility (including refrigeration requirements) will be less than other systems. For example, a SGTU with acid gas compression would require in the order of 15% or more installed horsepower than a comparable acid gas Fractionation system of the present invention. As the processes of the present invention replace a large portion of the acid gas compression with much cheaper refrigeration compression, significant capital and operating savings are realized. This is further illustrated in the example presented below.

Case 1 is an example of the acid gas fractionation processes of the present invention for one possible inlet sour gas composition, as specifically indicated therein. Many different inlet sour gas compositions are possible with varying $H_2S$ and $CO_2$ concentrations from 10 mol. % to 85 mol. %.

Case 1 can be used to illustrate the advantages of the acid gas fractionation process over other bulk acid gas removal process, such as a Sour Gas Treating Unit, using a physical solvent.

Table 1 is a comparison of operating conditions and capital costs for two facilities designed for bulk acid gas removal from an inlet sour gas stream. The first facility uses the acid gas fractionation process of the present invention for removing the acid gas and recovering it in a liquid form for pumping down a disposal well. No acid gas compression is required with this design. The second facility uses a physical solvent in a Sour Gas Treating Unit for removing acid gas.

The physical solvent is the best solvent choice for bulk acid gas removal since it can be flash regenerated, eliminating the need for a stripping column and reboiler. The process of a SGTU using a physical solvent instead of a chemical solvent has the advantage of recovering some of the acid gas at intermediate pressures by carrying out the flash regeneration in several steps using a high pressure separator, a medium pressure separator and a low pressure separator. Acid gas from the separators will flow to a multi-stage acid gas compressor before being injected into a disposal well.

The biggest difference between the two designs is the reduction in installed horsepower and the shift from sour compression to sweet compression for the acid gas fractionation plant design using the process of the present invention. Less installed horsepower reduces capital costs and fuel gas consumption. Sweet compression is less expensive to install and costs less to maintain. These are the main reasons for the lower capital cost of the facility of the present invention versus the SGTU plant design.

Equally important is the long term operating savings. With less installed horsepower, more sweet compression and less sour compression, compressor maintenance costs will be reduced. There are also significant savings in fuel gas of approximately $1.3 mm USD/yr (based on gas engine drivers for compressor equipment and power generators, and a fuel gas value of $1.5/mscf, 1000 btu/scf) using the acid gas fractionation process. There are no solvent losses to replace as no solvent is used in the process.

TABLE 1

COMPARISON OF PLANT OPERATION AND CAPITAL COSTS FOR A 100 MMSCFD BULK ACID GAS REMOVAL FACILITY WITH AN INLET COMPOSITION OF 20% H2S, 10% $CO_2$, 69% METHANE AND 1% ETHANE+

| ITEM | ACID GAS FRACTIONATION | SGTU FACILITY |
|---|---|---|
| Sour Compression | 1500 hp | 5100 hp |
| Sweet Compression | 4500 hp | — |
| Power Generation | 700 hp | 2600 hp |
| Total Operating HP | 6700 hp | 7800 hp |
| Fuel Gas Usage/Losses | 1.5 mmscfd | 3.9 mmscfd |
| Fuel Gas Costs @ $1.5 per mmscf | $800,00 USD/yr | 2,080,000 USD/yr |
| Solvent used/circulation Initial Fill | None Required | Physical Solvent 2100 usgpm |
| Chemical Costs | $50,000 USD | $2,000,000 USD |
| Installed Capital Cost (est.) | $23,500.00 USD | $26,170.00 USD |
| Estimated Yearly Operating Cost (Comp. Maintenance, Chemical Costs, Labor Costs, Fuel Gas Costs) | $2,300,000 USD | $3,800,000 USD* |

*Includes the cost of F.G. lost with the acid gas

ACID GAS FRACTIONATION
CASE 1: 20% H2S, 10% CO2
(AS INDICATED IN FIG. 1)

| | |
|---|---|
| E1 DUTY −1.361e + 07 Btu/hr | K1.DUTY POWER 1498. hp |
| E3 DUTY −2.103e + 06 Btu/hr | P1.DUTY POWER 190.6 hp |
| E2.DUTY HEAT FLOW 1.379e + 07 Btu/hr | V3.REB.DUTY HEAT FLOW 6.485e + 06 Btu/hr |
| E4.DUTY HEAT FLOW 2.365e + 06 Btu/hr | |

| | HYSYS Workbook Specsheet (All Pages) AG FRAC PLANT CASE 1.hsc | | | | | |
|---|---|---|---|---|---|---|
| | Case (Main) | | | | | |
| | Material Streams | | | | | |
| Name | | 1 | 1a | 2 | 3 | 3L |
| Vapour Fraction | | 1.0000 | 1.0000 | 0.9747 | 0.7958 | 0.0000 |
| Temperature | (F.) | 100.0* | 100.0 | 11.50 | −33.00* | −33.00 |
| Pressure | (psia) | 1015.* | 1015. | 1005. | 995.0 | 995.0 |
| Molar Flow | (MMSCFD) | 100.0* | 100.0 | 100.0 | 100.0 | 20.42 |
| Mass Flow | (lb/hr) | 2.483e+05 | 2.483e+05 | 2.483e+05 | 2.483e+05 | 6.972e+04 |
| Liquid Volume Flow | (USGPM) | 1130. | 1130. | 1130. | 1130. | 213.8 |
| Heat Flow | (Btu/hr) | −4.568e+08 | −4.568e+08 | −4.704e+08 | −4.842e'08 | −1.028e+08 |
| Name | | 3V | 4 | 5 | 5L | 5V |
| Vapour Fraction | | 1.0000 | 0.96729 | 0.9291 | 0.0000 | 1.0000 |
| Temperature | (F.) | −33.00 | −42.10* | −55.86 | −55.86 | −55.86 |
| Pressure | (psia) | 995.0 | 985.0 | 780.0* | 780.0 | 780.0 |
| Molar Flow | (MMSCFD) | 79.58 | 79.58 | 79.58 | 5.646 | 73.93 |
| Mass Flow | (lb/hr) | 1.785e+05 | 1.785e+05 | 1.785e+05 | 1.972e+4 | 1.588e+05 |
| Liquid Volume Flow | (USGPM) | 916.5 | 916.5 | 916.5 | 59.26 | 857.2 |
| Heat Flow | (Btu/hr) | −3.814e+08 | −3.835+08 | −3.835e+08 | −3.160e+07 | −3.519e+08 |
| Name | | 6 | 7 | 8 | 9 | 10 |
| Vapour Fraction | | 0.1091 | 1.0000 | 0.9981 | 0.9964 | 1.0000 |
| Temperature | (F.) | −39.80 | −45.97 | −56.58 | −56.21 | −42.97 |
| Pressure | (psia) | 780.0* | 760.0 | 770.0* | 760.0 | 750.0 |
| Molar Flow | (MMSCFD) | 20.42 | 7.837 | 73.93 | 81.77 | 81.77 |
| Mass Flow | (lb/hr) | 6.972e+04 | 1.734e+04 | 1.588e+05 | 1.762e+05 | 1.762e+05 |
| Liquid Volume Flow | (USGPM) | 213.8 | 90.83 | 857.2 | 948.0 | 948.0 |
| Heat Flow | (Btu/hr) | −1.028e+08 | −3.889e+07 | −3.519e+08 | −3.908e+08 | −3.887e+08 |
| Name | | 11 | 12 | 13 | 14 | 15 |
| Vapour Fraction | | 1.000 | 1.000 | 1.000 | 0.000 | 0.000 |
| Temperature | (F.) | 90.00 | 145.0 | 120.0* | 114.4 | 135.9 |
| Pressure | (psia) | 740.0 | 1015.* | 1010. | 765.0 | 2000.* |
| Molar Flow | (MMSCFD) | 81.77 | 81.77 | 81.77 | 18.23 | 18.23 |
| Mass Flow | (lb/hr) | 1.762e+05 | 1.762e+05 | 1.762e+05 | 7.210e+04 | 7.210e+04 |
| Liquid Volume Flow | (USGPM) | 948.0 | 948.0 | 948.0 | 182.2 | 182.2 |
| Heat Flow | (Btu/hr) | −3.751e+08 | −3.713e+08 | −3.737e+08 | −8.901e+07 | −8.853e+07 |
| Name | | 16 | 17 | | | |
| Vapour Fraction | | 0.000 | 0.000 | | | |
| Temperature | (F.) | 135.9 | 135.9 | | | |
| Pressure | (psia) | 2000. | 2000. | | | |
| Molar Flow | (MMSCFD) | 0.0000 | 18.23 | | | |
| Mass Flow | (lb/hr) | 0.0000 | 7.210e+04 | | | |
| Liquid Volume Flow | (USGPM) | 0.0000 | 182.2 | | | |
| Heat Flow | (Btu/hr) | 0.0000 | −8.853e+07 | | | |

Remarks:

| | HYSYS Workbook Specsheet (All Pages) AG FRAC PLANT CASE 1.hsc | | | | |
|---|---|---|---|---|---|
| | Case (Main) | | | | |
| | Compositions | | | | |
| Name | 1 | 2 | 10 | 11 | 3 |
| Comp Mole Frac (Nitrogen) | 0.0050* | 0.0050 | 0.0061 | 0.0061 | 0.0050 |
| Comp Mole Frac (CO2) | 0.1000* | 0.1000 | 0.08014 | 0.08014 | 0.1000 |
| Comp Mole Frac (H2S) | 0.2000* | 0.2000 | 0.06659 | 0.06659 | 0.2000 |
| Comp Mole Frac (Methane) | 0.6900* | 0.6900 | 0.8436 | 0.8436 | 0.6900 |
| Comp Mole Frac (Ethane | 0.003000* | 0.003000 | 0.002719 | 0.002719 | 0.00300 |
| Comp Mole Frac (Propane) | 0.001600* | 0.001600 | 0.0008108 | 0.0008108 | 0.001600 |
| Comp Mole Frac (CS2) | 5.000e−05* | 5.000e−05 | 6.365e−08 | 6.365e−08 | 5.000e−05 |
| Comp Mole Frac (COS) | 0.0001000* | 0.0001000 | 1.827e−05 | 1.827e−05 | 0.0001000 |
| Comp Mole Frac (M-Mercaptan) | 0.0002000* | 0.0002000 | 2.284e−06 | 2.284e−06 | 0.0002000 |
| Comp Mole Frac (E-Mercaptan) | 5.000e−05* | 5.000e−05 | 8.723e−08 | 8.723e−08 | 5.000e−05 |
| Comp Mole Frac (H2O) | 0.0000* | 0.0000 | 0.0000 | 0.0000 | 0.0000 |
| Name | 3V | 3L | 12 | 13 | 4 |
| Comp Mole Frac (Nitrogen) | 0.0061 | 0.0006 | 0.0061 | 0.0061 | 0.0061 |
| Comp Mole Frac (CO2) | 0.08626 | 0.1536 | 0.08014 | 0.08014 | 0.08626 |
| Comp Mole Frac (H2S) | 0.1016 | 0.5835 | 0.06659 | 0.06659 | 0.1016 |
| Comp Mole Frac (Methane) | 0.8021 | 0.2531 | 0.8436 | 0.8436 | 0.8021 |
| Comp Mole Frac (Ethane | 0.002798 | 0.003788 | 0.002719 | 0.002719 | 0.002798 |
| Comp Mole Frac (Propane) | 0.001051 | 0.003739 | 0.0008108 | 0.0008108 | 0.001051 |
| Comp Mole Frac (CS2) | 1.857e−06 | 0.0002376 | 6.365e−08 | 6.365e−08 | 1.857e−06 |
| Comp Mole Frac (COS) | 3.768e−05 | 0.0003428 | 1.827e−05 | 1.827e−05 | 3.768e−05 |
| Comp Mole Frac (M-Mercaptan) | 2.016e−05 | 0.0009008 | 2.284e−06 | 2.284e−06 | 2.016e−05 |
| Comp Mole Frac (E-Mercaptan) | 2.175e−06 | 0.0002364 | 8.723e−08 | 8.723e−08 | 1.275e−06 |
| Comp Mole Frac (H2O) | 0.0000 | 0.0000 | 0.0000 | 0.0000 | 0.0000 |
| Name | 9 | 5 | 5V | 5L | 6 |
| Comp Mole Frac (Nitrogen) | 0.0061 | 0.0061 | 0.0066 | 0.0005 | 0.0006 |
| Comp Mole Frac (CO2) | 0.08014 | 0.08626 | 0.07867 | 0.1857 | 0.1536 |
| Comp Mole Frac (H2S) | 0.06659 | 0.1016 | 0.06550 | 0.5742 | 0.5835 |
| Comp Mole Frac (Methane) | 0.8436 | 0.8021 | 0.8458 | 0.2303 | 0.2531 |
| Comp Mole Frac (Ethane | 0.002719 | 0.002798 | 0.002675 | 0.004404 | 0.003788 |
| Comp Mole Frac (Propane) | 0.0008108 | 0.001051 | 0.0007980 | 0.004364 | 0.003739 |
| Comp Mole Frac (CS2) | 6.365e−08 | 1.857e−06 | 6.254e−08 | 2.535e−05 | 0.0002376 |
| Comp Mole Frac (COS) | 1.827e−05 | 3.768e−05 | 1.798e−05 | 0.0002958 | 0.0003428 |
| Comp Mole Frac (M-Mercaptan) | 2.284e−06 | 2.016e−05 | 2.245e−06 | 0.0002547 | 0.0009008 |
| Comp Mole Frac (E-Mercaptan) | 8.723e−08 | 2.175e−06 | 8.573e−08 | 2.954e−05 | 0.0002364 |
| Comp Mole Frac (H2O) | 0.0000 | 0.0000 | 0.0000 | 0.0000 | 0.0000 |
| Name | 7 | 14 | 15 | 8 | 1a |
| Comp Mole Frac (Nitrogen) | 0.0019 | 0.0000 | 0.0000 | 0.0066 | 0.0050 |
| Comp Mole Frac (CO2) | 0.09400 | 0.1891 | 0.1891 | 0.07867 | 0.1000 |
| Comp Mole Frac (H2S) | 0.07690 | 0.7984 | 0.7984 | 0.06550 | 0.2000 |
| Comp Mole Frac (Methane) | 0.8231 | 0.0009990 | 0.0009990 | 0.8458 | 0.6900 |
| Comp Mole Frac (Ethane | 0.003135 | 0.004259 | 0.004259 | 0.0032675 | 0.00300 |
| Comp Mole Frac (Propane) | 0.0009318 | 0.005140 | 0.005140 | 0.0007980 | 0.001600 |
| Comp Mole Frac (CS2) | 7.408e−08 | 0.0002740 | 0.0002740 | 6.254e−08 | 5.000e−05 |
| Comp Mole Frac (COS) | 2.100e−05 | 0.0004666 | 0.0004666 | 1.798e−05 | 0.0001000 |
| Comp Mole Frac (M-Mercaptan) | 2.651e−06 | 0.001087 | 0.001087 | 2.245e−06 | 0.0002000 |
| Comp Mole Frac (E-Mercaptan) | 1.014e−07 | 0.0002739 | 0.0002739 | 8.573e−08 | 5.000e−05 |
| Comp Mole Frac (H2O) | 0.0000 | 0.0000 | 0.0000 | 0.0000 | 0.0000 |

Remarks:

HYSYS Workbook Specsheet (All Pages) AG FRAC PLANT CASE 1.hsc

-continued

| | Case (Main) | |
|---|---|---|
| | Compositions | |
| Name | 16 | 17 |
| Comp Mole Frac (Nitrogen) | 0.000 | 0.000 |
| Comp Mole Frac (CO2) | 0.1891 | 0.1891 |
| Comp Mole Frac (H2S) | 0.7984 | 0.7984 |
| Comp Mole Frac (Methane) | 0.0009990 | 0.0009990 |
| Comp Mole Frac (Ethane) | 0.004259 | 0.004259 |
| Comp Mole Frac (Propane) | 0.005140 | 0.005140 |
| Comp Mole Frac (CS2) | 0.0002740 | 0.0002740 |
| Comp Mole Frac (COS) | 0.0004666 | 0.0004666 |
| Comp Mole Frac (M-Mercaptan) | 0.001087 | 0.001087 |
| Comp Mole Frac (E-Mercaptan) | 0.0002739 | 0.0002793 |
| Comp Mole Frac (H2O) | 0.0000 | 0.0000 |

Remarks:

Those skilled in the art will appreciate that various adaptations and modifications of the just-described preferred embodiments may be configured without departing from the scope and spirit of the invention. Therefore, it is to be understood that, within the scope of the appended claims, the invention may be practiced other than as specifically described herein.

What is claimed is:

1. Process for the bulk removal of $H_2S$ and $CO_2$ from a sour gas stream, which comprises:

a) feeding a dry, sour gas stream containing a mixture of $H_2S$ and $CO_2$ Into a gas/gas exchanger and a chiller to cool the dry, sour gas;

b) feeding the cooled, dry, sour gas into a separator to obtain a gaseous top product and a condensed liquid acid gas bottoms product;

c) feeding the condensed liquid acid gas bottoms product to a fractionation tower, to strip further vapors from the condensed liquid acid gas bottoms product and obtain a pressurized, condensed liquid acid gas bottoms product and over head vapors; and d) combining and mixing the gaseous top product from the separator and the overhead vapors from the fractionation column and feeding them into the gas/gas exchanger to exchange heat with the dry, sour gas stream.

2. The process of claim 1 wherein said gaseous top product from said separator is further cooled to a cryogenic level and fed to a further separator where a further condensed liquid acid gas is obtained as a bottoms products, which further condensed liquid acid gas bottoms product from said further separator is fed to said fractionation tower.

3. The process of claim 2 wherein said gaseous product from said separator is further cooled in a cold gas exchanger and the pressure thereof is dropped across a Joule-Thompson valve.

4. The process of claim 2 wherein said gaseous product from said separator is further cooled in a cold gas exchanger and the pressure thereof is dropped across a turbo-expander.

5. The process of claim 2 wherein said further condensed liquid acid gas bottoms product is at an elevated pressure, and may be pumped or free flowed into a disposal well.

6. The process of claim 5, further including a compressor to compress said dry, sour gas stream before said gas/gas exchanger and said chiller so as to raise the pressure of said dry, sour gas stream.

7. The process of claim 6 wherein said gaseous product from said separator is further cooled in a gas exchanger and the pressure thereof is dropped across a turbo-expander.

8. The process of claim 1, further including a mixer at said inlet to said gas/gas exchanger and said chiller, and mixing a portion of said pressurized condensed liquid acid gas bottoms product with said dry, sour gas stream to prevent or remove sulphur deposits.

9. The process of claim 1, further including a compressor to compress said dry, sour gas stream before said gas/gas exchanger and said chiller so as to raise the pressure of said dry, sour gas stream.

10. The process of claim 9 wherein said gaseous product from said separator is further cooled in a gas exchanger and the pressure thereof is dropped across a turbo-expander.

11. The process of claim 1, further including the step of pumping the pressurized, condensed liquid acid into a disposal well.

12. The process of claim 1, further including the step of free flowing the pressurized, condensed liquid acid gas bottoms product into a disposal well.

13. The process of claim 1 wherein the pressurized, condensed liquid acid gas bottoms product is at an elevated pressure, and may be pumped or free-flowed into a disposed well.

14. The process of claim 1 wherein the dry, sour gas stream has a combined $H_2S$ and $CO_2$ concentration greater than 10%.

15. The process of claim 14 wherein the dry, sour gas stream has a combined $H_2S$ and $CO_2$ concentration from 10% to 85%.

16. Process for the bulk removal of $H_2S$ and $CO_2$ from a sour gas stream which comprises:

a) feeding a dry, sour gas stream containing a mixture of $H_2S$ and $CO_2$ into an inlet to a gas/gas exchanger and a chiller, to cool the dry, sour gas;

b) feeding the cooled, dry, sour gas into a separator to obtain a gaseous top product, and a condensed liquid acid gas bottoms product;

c) feeding the condensed liquid acid gas bottoms product to a fractionation tower, to strip further vapors from the condensed liquid acid gas bottoms product and obtain a further condensed liquid acid gas bottoms product and overhead vapors;

d) cooling said gaseous top product from said separator to a cryogenic level and feeding said cooled gaseous top product to a further separator where further condensed liquid acid gas is obtained as a bottoms products and further overhead vapors are obtained; the further condensed liquid acid gas bottoms product from said further separator being fed to said fractionation tower;

e) combining and mixing the further overhead vapors from the further separator and the overhead vapors from the fractionation column and feeding them into the gas/gas exchanger to exchange heat with the dry, sour gas stream; and f) dropping the pressure of said gaseous product from said separator across a Joule-Thompson valve.

17. The process of claim 16, further including the step of mixing a portion of said pressurized condensed liquid acid gas bottoms product with said dry, sour gas stream at the inlet to the gas/gas exchanger.

18. The process of claim 16 wherein the dry, sour gas stream has a combined $H_2S$ and $CO_2$ concentration greater than 10%.

19. Process for the removal of $H_2S$ and $CO_2$ from a sour gas stream which comprises:

a) feeding a dry, sour gas stream containing a mixture of $H_2S$ and $CO_2$ into an inlet to a gas/gas exchanger and a chiller to cool the dry, sour gas;

b) feeding the cooled, dry, sour gas into a first separator to obtain a first gaseous top product, and a first condensed liquid acid gas bottoms product;

c) feeding the condensed liquid acid gas bottoms product to a fractionation tower, to strip further vapors from the first condensed liquid acid gas bottoms product and obtain a second pressurized condensed liquid acid gas bottoms product and overhead vapors;

d) cooling said first gaseous top product from said first separator to a cryogenic level in a cold gas exchanger and feeding said cooled first gaseous top product to a second separator where a second condensed liquid acid gas is obtained as a bottoms products, and a second gaseous top product; the second condensed liquid acid gas bottoms product from said second separator being fed to said fractionation tower;

e) combining and mixing the second gaseous product from the second separator and the overhead vapors from the fractionation column and feeding them into the gas/gas exchanger to exchange heat with the dry, sour gas stream; and f) dropping the pressure of said first gaseous top product from said first separator across a turbo-expander.

20. The process of claim 19 wherein the dry, sour gas stream has a combined $H_2S$ and $CO_2$ concentration from 10% to 85%.

* * * * *